(12) United States Patent
Yamada

(10) Patent No.: US 6,341,121 B1
(45) Date of Patent: Jan. 22, 2002

(54) RECORDER

(75) Inventor: Hideaki Yamada, Shimo-Suwa-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/117,834

(22) PCT Filed: Dec. 16, 1997

(86) PCT No.: PCT/JP97/04645

§ 371 Date: Aug. 12, 1998

§ 102(e) Date: Aug. 12, 1998

(87) PCT Pub. No.: WO98/27550

PCT Pub. Date: Jun. 25, 1998

(30) Foreign Application Priority Data

Dec. 16, 1996 (JP) .............................................. 8-336119

(51) Int. Cl.⁷ ................................................. G11B 7/24
(52) U.S. Cl. .................... 369/275.3; 369/278; 430/321; 428/64.4
(58) Field of Search ........................... 369/275.3, 275.1, 369/116, 47.15, 47.1, 53.11, 59.1, 53.2, 278.4, 277, 278, 109.01, 111, 44.26, 100, 13; 430/321; 428/64.4

(56) References Cited

U.S. PATENT DOCUMENTS 5,040,165 A * 8/1991 Taii et al. ................. 369/275.4
5,084,860 A    1/1992 Maeda et al.
5,581,531 A   12/1996 Ito et al.
5,654,953 A * 8/1997 Yoshida et al. ........... 369/275.1

FOREIGN PATENT DOCUMENTS

JP    02073543    3/1990
JP    8-321042   12/1996

OTHER PUBLICATIONS

JP 01–286122A (Nec Corp.). Patent Abstracts of Japan, vol. 14, No. 64 (P–1002). Feb. 6, 1990 (abstract).

* cited by examiner

Primary Examiner—Ali Neyzari
(74) Attorney, Agent, or Firm—Harness, Dickey & Pierce, P.L.C.

(57) ABSTRACT

In a recording apparatus, a pit gain selection circuit 33 converts an amplitude proportional to pit length data into gain data, and outputs the gain data to a pit cutting signal generation circuit 39 via a timing adjustment circuit 35. The generation circuit 39 selects gain data proportional to each pulse duration of a pit signal and converts it into an analog signal. A groove correction value selection circuit 41 converts the analog signal into a groove correction value on the basis of the pit length data, and outputs the groove correction value to a groove correction signal generation circuit 47 via a timing adjustment circuit 45. The generation circuit 47 calculates a magnitude of groove signal correction, converts it into an analog signal, and outputs it to a subtractor 51. The subtractor 51 subtracts the analog signal from this analog signal. Power equivalent to power to be superposed on a light beam used for forming grooves because of the side lobe of a light beam used for forming pits is canceled only during cutting for forming pits. There is thus provided a recording apparatus capable of manufacturing an optical disk from which signals properly representing pits and grooves can be reproduced even when the density of tracks is physically increased.

3 Claims, 6 Drawing Sheets

RECORDER

TECHNICAL FIELD

The present invention relates to a laser cutting machine (hereinafter a recording apparatus), or more particularly, to an improvement to an apparatus for manufacturing an optical disk stamper (die assembly) useful in mass-producing an optical disk.

BACKGROUND ART

In recent years, several methods have been proposed for increasing the storage capacity of an optical disk. One of the methods is to physically raise the density of tracks, that is, to narrow a pitch between tracks. Another proposal has been made on the assumption that a finer pit is used for representing the same data, and standardization has progressed.

For narrowing a pitch between tracks, grooves defining each track or pits formed between the grooves must be made thinner. For this purpose, an optical system included in a recording apparatus employed during a mastering process or the like is controlled in order to make the diameter of a spot beam emanating from a laser smaller than that of a conventional spot beam.

A method utilizing super-resolution has been discussed. What is referred to as super-resolution is a phenomenon that a lens exhibiting a limit value of a numerical aperture (NA) that counts in cutting is used to make a spot laser beam, which has been diffraction-limited λNA, even smaller by utilizing the diffraction effects of light.

However, when the method utilizing super-resolution is adopted, the intensity of a first side lobe of a spot beam emanating from the laser increases. This adversely affects a disk during cutting. The adverse effect is intensified when cutting is carried out to form pits and grooves simultaneously.

For example, when cutting is carried out to form grooves consecutively, if a disk is exposed to a laser beam used to cut the disk for recording and it is modulated according to a certain signal (simultaneous cutting of pit and groove), the side lobe of the laser beam used for forming a pit overlaps a laser beam used for forming a groove. The power of the laser beam used for forming a groove increases substantially. As a result, a deep and broad groove is formed by the side of the pit. This poses a problem that an optical disk is manufactured from which signals properly representing pits and grooves respectively cannot be reproduced.

Accordingly, an object of the present invention is to provide a recording apparatus capable of manufacturing an optical disk from which signals properly representing pits and grooves respectively can be reproduced even when the density of tracks is physically increased.

SUMMARY OF THE INVENTION

A recording apparatus in accordance with the present invention for carrying out cutting so as to simultaneously form pits and grooves on the basis of a supplied pit signal and groove signal comprises: a pit cutting signal generating means for generating and outputting a pit cutting signal whose amplitude is proportional to each pit length or the length of each pit indicated by the pit signal; and a groove cutting signal generating means for generating a groove cutting signal by subtracting a magnitude of correction associated with each pit length indicated by the pit signal from the amplitude of the groove signal, and outputting the groove cutting signal according to the timing of outputting the pit cutting signal.

According to the constituent features, a magnitude of correction associated with each pit length indicated by the pit signal is subtracted from the amplitude of the groove signal in order to produce a groove recording signal. The groove recording signal is output according to the timing of outputting the pit cutting signal. Even when the side lobe of a laser beam used for forming pits overlaps a laser beam used for forming grooves, the power of the laser beam used for forming grooves is canceled by the power of the side lobe. Consequently, it will not take place that the depth or breadth of a portion of a groove adjacent to a pit gets larger than the other portions thereof.

According to a preferred embodiment of the present invention, when a pit length is relatively large, a magnitude of correction is set to a large value. When a pit length is relatively small, the magnitude of correction is set to a small value.

This is because when a pit length is relatively large, the possibility that a groove gets broader or deeper because of the aforesaid side lobe increases.

DETAILED DESCRIPTION OF THE PREFERRED EMBODIMENT

An embodiment of the present invention will be described with reference to the drawings.

Figure 1:
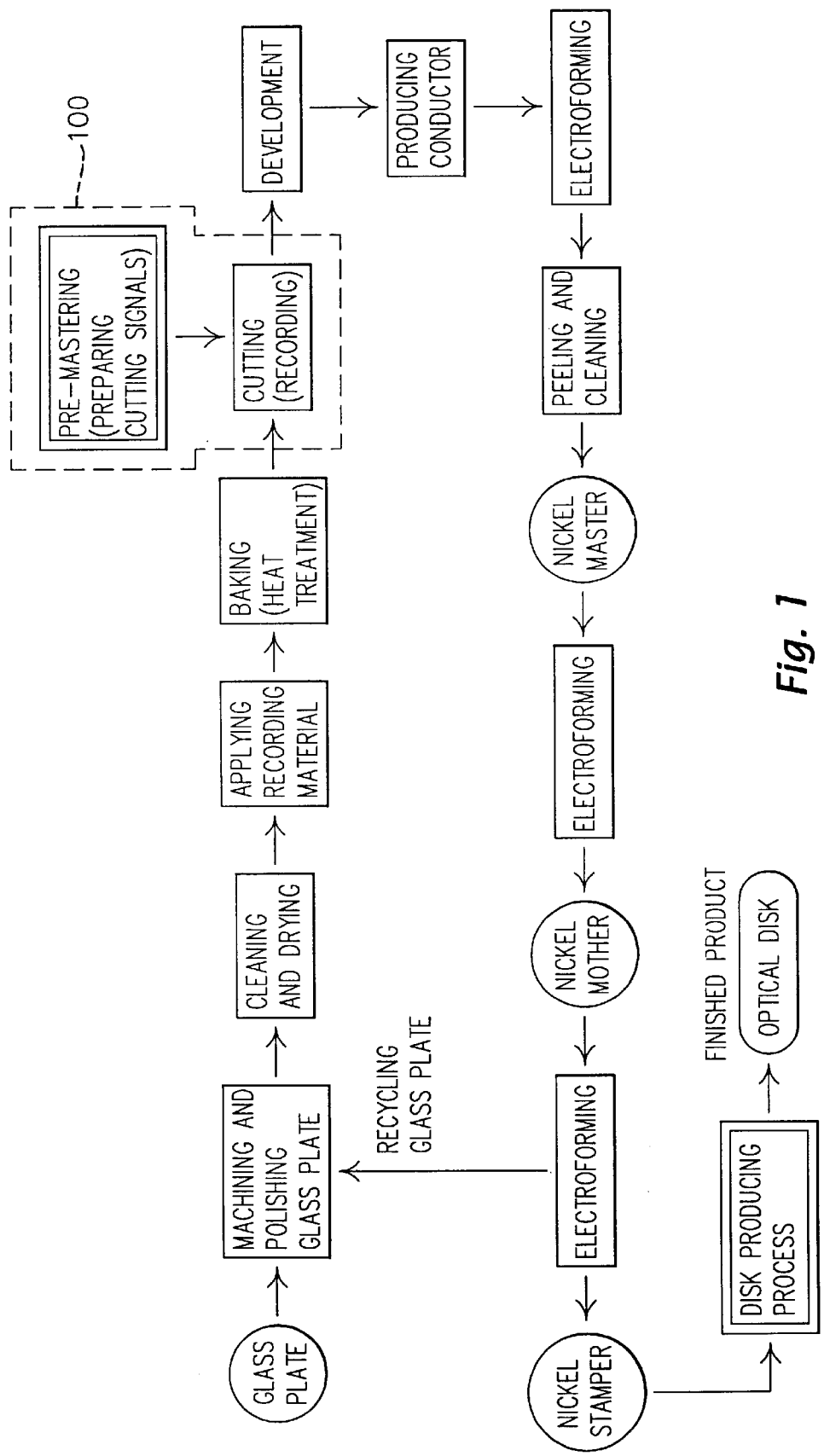
FIG. 1 is a schematic drawing showing a mastering process to which the present invention is adapted.

FIG. 1 shows the outline of a mastering process to which the present invention is adapted.

The present invention is adapted to a process 100, that is, a pre-mastering (for preparing recording signals) process and cutting (for recording) process among the processes described in FIG. 1. A mastering process is a process for creating a stamper or die assembly used to mass-produce an optical disk serving as a high-density information recording medium (memory) by utilizing a (resin) molding technique, and is already well-known. The description of the mastering process will therefore be omitted.

Figure 2:
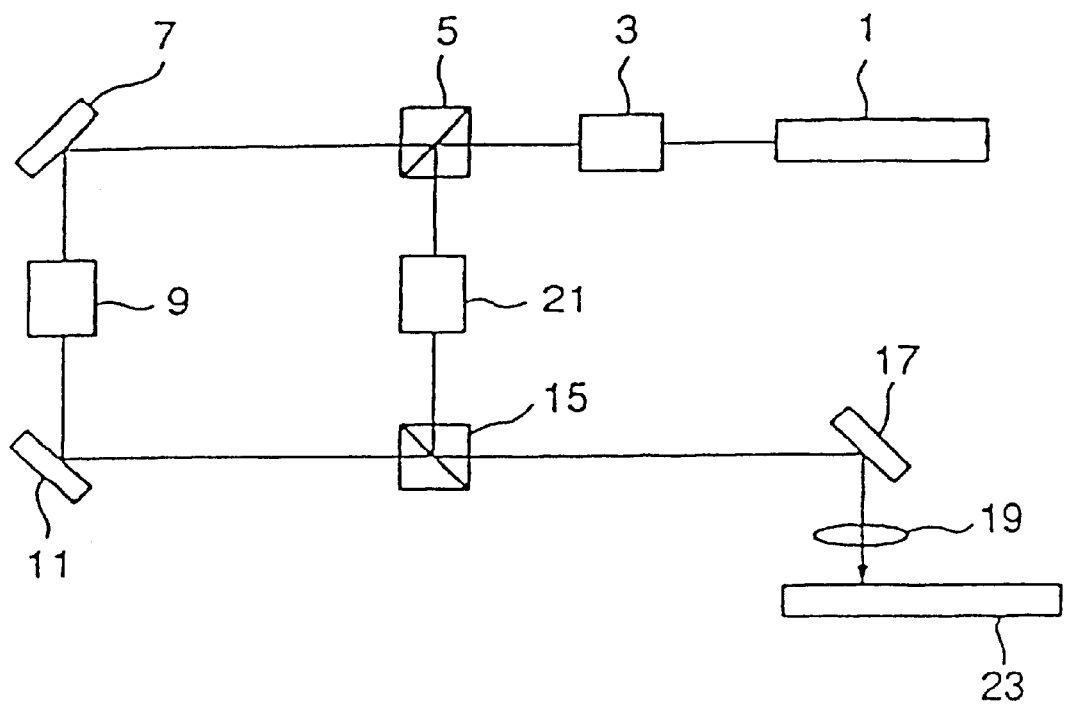
FIG. 2 is a block diagram showing an optical system included in a recording apparatus to which the present invention is adapted.

FIG. 2 is a block diagram showing an optical system included in a cutting apparatus (laser recording apparatus) in accordance with the first embodiment of the present invention.

The apparatus is employed in the process 100 in FIG. 1. The basic components of the apparatus are a light source 1, a plurality of light modulators 3, 9, and 21, a plurality of polarizing splitter devices 5 and 15, a plurality of mirrors 7, 11, and 17, and an objective lens 19.

A laser for emitting blue light with wavelengths of 400 nm to 450 nm is normally used as the light source 1.

The light modulator 3 stabilizes the intensity of laser light by, on the basis of a light value control signal and noise elimination signal supplied externally, eliminating a noise from laser light emanating from the gas laser serving as the light source 1 and controlling the amount of laser light. For example, an electro-optic modulator (EOM) utilizing a change in refractive index caused by applying an electric field is used as the light modulator 3.

The polarizing splitter device 5 splits the laser light emitted from the light source 1 via the light modulator 3 into a light beam used for forming pits and a light beam used for forming grooves. A polarization beam splitter (PBS) is used as the polarizing splitter device 5.

Figure 4:
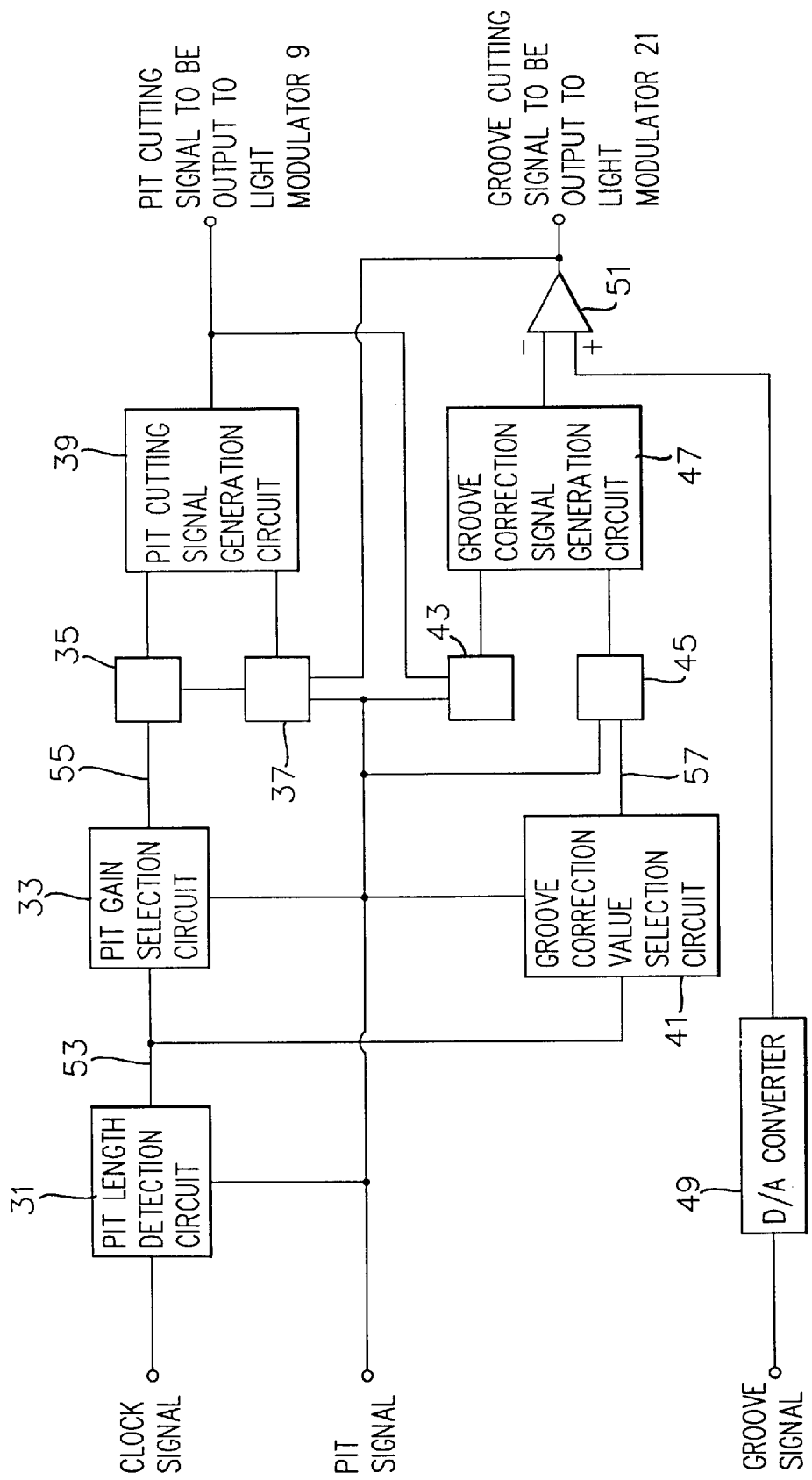
FIG. 4 is a block diagram showing a signal generator included in a recording apparatus in accordance with an embodiment of the present invention.

The light modulator 9 controls the on-off switching of a light source used for forming pits and supplied from the polarizing splitter device 5 via the mirror 7 according to a pit cutting signal (indicating a pattern of pits to be formed) sent from the signal generator shown in FIG. 4. For example, an acousto-optic modulator (AOM) is used as the light modulator 9.

The light modulator 21 is a device for controlling the intensity of a light beam used for forming grooves and supplied from the polarizing splitter device 5 according to a groove cutting signal sent from the polarizing and splitting device 5. For example, an acousto-optic modulator (AOM) is used.

The polarizing splitter device 15 bundles a light beam used for forming pits and supplied from the mirror 11 and a light beam used for forming grooves and controlled by the light modulator 21, and returns the bundle to one optical path. A polarization beam splitter (PBS) is used as the polarizing splitter device 15.

Figure 3:
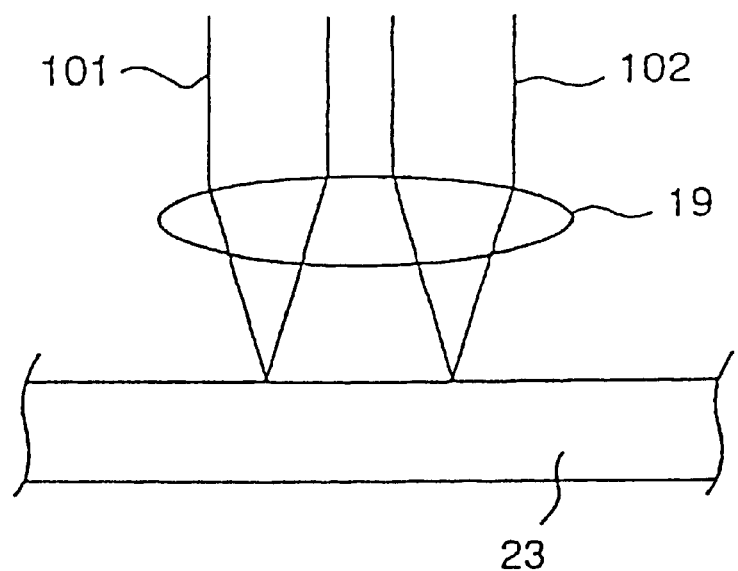
FIG. 3 is a diagram showing a light beam used for forming pits and a light beam used for forming grooves which are converged on a resist base.

The objective lens 19 converges two spot beams 101 and 102 in FIG. 3, that is, a spot beam used for forming pits and supplied from the polarizing splitter device 15 via the mirror and a spot beam used for forming grooves on the resist base 23. The laser beam used for forming pits and the laser beam used for forming grooves shall have been adjusted not to be displaced while being spaced by a half of a pitch between tracks in a radial direction of the resist base 23.

FIG. 4 is a block diagram showing a signal generator included in the recording apparatus in accordance with the embodiment of the present invention.

The signal generator generates a pit cutting signal according to which the light modulator 9 in FIG. 2 controls the on-off switching of a light beam used for forming pits, and generates a groove cutting signal according to which the light modulator 21 controls the intensity of a light beam used for forming grooves. The signal generator comprises, as illustrated, a pit length detection circuit 31, a pit gain selection circuit 33, a plurality of timing (phase) adjustment circuits 35, 37, 43, and 45, a pit cutting signal generation circuit 39, a groove correction value selection circuit 41, a groove correction signal generation circuit 47, a D/A converter 49, and a subtractor 51.

The pit length detection circuit 31 calculates the logical AND of an input pit signal generated synchronously with a clock signal by a pit signal generation source (not shown), and a clock signal input from a clock signal generation source (not shown). Based on the number of input clock pulses, a pit length or the length of a pit indicated by the pit signal is detected and converted into, for example, 4-bit or 8-bit data (which shall be referred to as pit length data). The pit length data is output to the pit gain selection circuit 33 and groove correction value selection circuit 41 over the data bus 53. The reason why the detection circuit 31 is used to detect a pit length is that the degree by which the breadth and depth of a groove are affected by the side lobe of a laser beam used for forming pits varies depending on a pit length. The pit length data is generated synchronously with the clock signal. The pit length data and clock signal are therefore mutually synchronous.

The pit gain selection circuit 33 is activated when triggered by a pit signal, and converts an amplitude (that is, a gain) proportional to a pit length into 8-bit or 16-bit data (that is, gain data) on the basis of input pit length data. The gain data is then output to the timing adjustment circuit 35 over the data bus 55.

The timing adjustment circuit 35 is activated when triggered by a pit signal supplied via the timing adjustment circuit 37, and adjusts the timing of the read gain data, which is to be output to the pit cutting signal generation circuit 39, according to the pit signal.

The timing adjustment circuit 37 is activated when triggered by a pit signal, and outputs a timing signal, which is used to adjust the timing of a pit cutting signal generated by the generation circuit 39 according to a groove cutting signal output from the subtractor 51, to the generation circuit 39.

The pit cutting signal generation circuit 39 selects gain data proportional to a pulse duration of a pit signal on the basis of gain data whose timing is adjusted by the adjustment circuit 35, and converts the gain data into an analog signal. The analog signal is then output to the light modulator 9 as a pit cutting signal synchronously with the timing signal sent from the adjustment circuit 37. This causes the light modulator 9 to convert the light beam used for forming pits into an analog form.

The groove correction value selection circuit 41 selects a groove power correction value or groove correction pulse frequency on the basis of input pit length data when triggered by a pit signal, and converts it into 8-bit or 16-bit data (that is, a groove correction value). The groove correction value data is output to the adjustment circuit 45 over the data bus 57. The groove power correction value or groove correction pulse frequency selected by the selection circuit 41 is determined with a pit length by which cutting is carried out and is therefore a predetermined value.

The timing adjustment circuit 43 is activated when triggered by a pit signal, and outputs a timing signal used to adjust the timing of outputting a groove correction signal generated by the groove correction signal generation circuit 47 to the generation circuit 47. During a process in which a pit cutting signal is generated using the pit signal, a delay is produced because a signal is processed by the detection circuit 31, selection circuit 33, adjustment circuits 35 and 37, and generation circuit 39. For delaying the groove cutting signal by a longer time interval than the delay of the pit cutting signal, the adjustment circuit 43 is requested to adjust the delay of the groove cutting signal. When a groove signal is a direct current (DC), the adjustment circuit 43 is not requested to delay a groove signal. When the groove signal is modulated in some way, the groove signal must be delayed.

The timing adjustment circuit 45 is activated when triggered by a pit signal, and adjusts the timing of groove correction value data read to be output to the generation circuit 47 according to the pit signal.

The groove correction signal generation circuit 47 calculates a magnitude of groove signal correction proportional to pit length data on the basis of groove correction value data whose timing is adjusted by the adjustment circuit 45 and converts it into an analog signal. The analog signal is output as a signal used for generating a pit cutting signal to the subtractor 51 synchronously with the timing signal sent from the adjustment circuit 43. The magnitude of correction is subtracted from a groove signal by the subtractor 51, thus preventing a drawback that a portion of a groove adjacent to a pit gets broader or deeper than the other portions thereof because of a side lobe caused by a spot beam of laser light used for forming pits. When the magnitude of correction gets too large, the portion of a groove may in turn get thinner or shallower than the other portions thereof. The magnitude of correction should therefore be set to a proper value.

The D/A converter 49 converts a groove signal input as a digital signal from a groove signal generation source (not shown) into an analog signal and outputs the analog signal to the subtractor 51.

The subtractor 51 subtracts the analog signal output from the generation circuit 47 from a groove signal converted into an analog signal by the D/A converter 49. Due to the subtraction, power equivalent to power to be superposed on a laser beam used for forming pits because of the side lobe of a laser beam used for forming pits is canceled only when cutting is carried out for forming pits. A signal resulting from the subtraction is output as a groove cutting signal from the subtractor 51 to the light modulator 21. This causes the light modulator 21 to modulate the light beam used for forming grooves in an analog form.

The timing (phase) adjustment circuits 35 to 45 adjust timing so as to phase a pit cutting signal output from the pit cutting signal generation circuit 39 to the light modulator 9 and a groove cutting signal output from the subtractor 51 to the light modulator 21. This prevents the cutting signals from becoming inconsistent in timing in the order of 10–8. Consequently, a drawback that portions of a groove other than a portion thereof adjacent to a pit get thinner can be prevented. At this time, the positions of the beams in the circumferential direction on the glass base shown in FIG. 3 must be adjusted in the order of $10^{-9}$, m.

Figure 5:
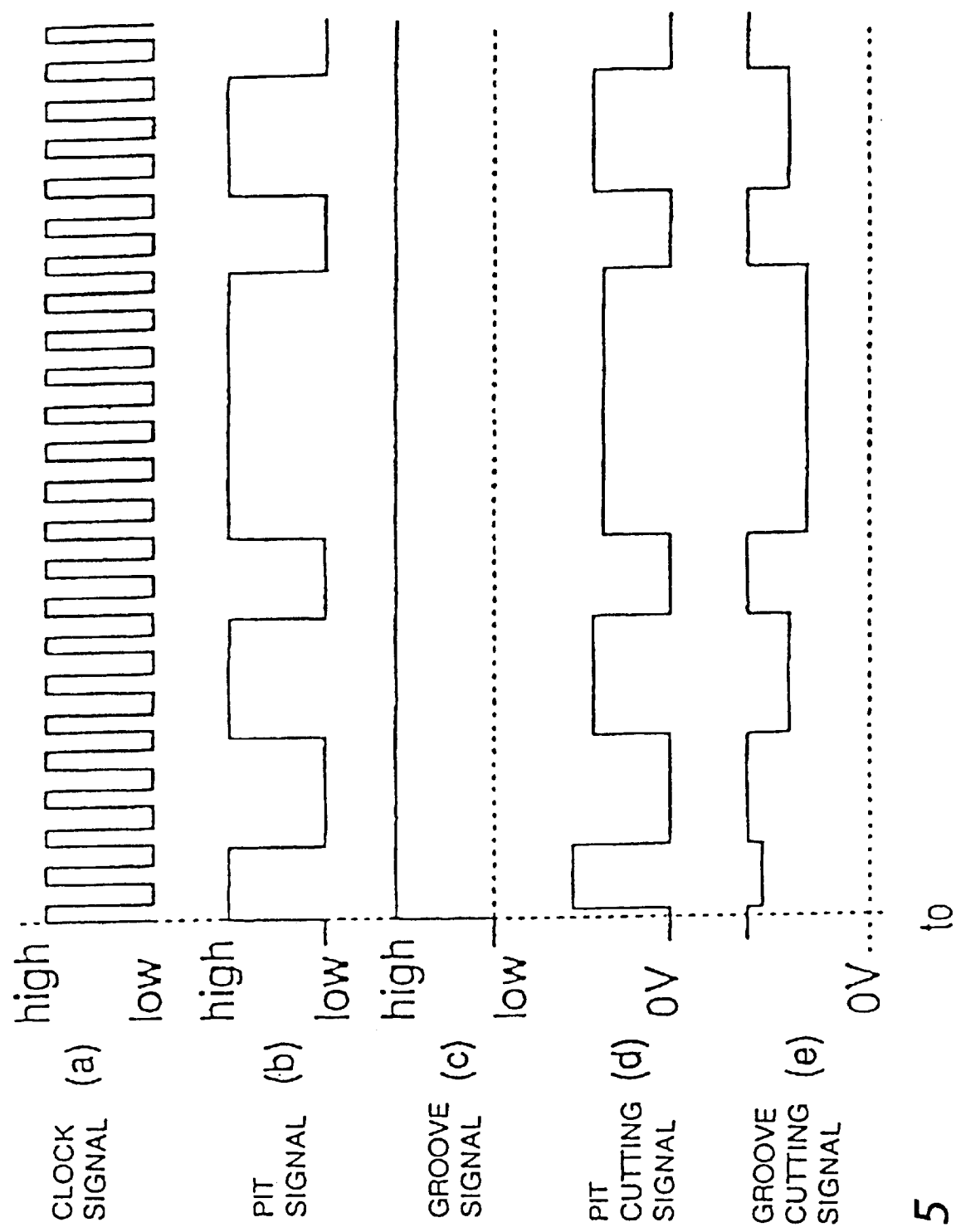
FIG. 5 is a timing chart indicating operations of signal processing performed by the signal generator shown in FIG. 4.

FIG. 5 is a timing chart indicating operations of signal processing performed by the signal generator shown in FIG. 4.

In FIG. 5, when cutting is started by exposing the resist base 23 to light for forming pits and grooves simultaneously at a time instant t0, a clock signal a is applied to the pit length detection circuit 31. A pit signal b is applied to the pit length detection circuit 31, pit gain selection circuit 33, timing adjustment circuits 35, 37, 43, and 45, and groove correction value selection circuit 41. A groove signal c rises with the start of cutting at the time instant t0, is converted into an analog signal by the D/A converter, and then applied to the subtractor 51.

At a step at which a pit cutting signal is generated using the pit signal, an analog signal d having a rectangular wave is generated as the pit cutting signal and output from the pit cutting signal generation circuit 39 to the light modulator 9. The pit cutting signal d represents gain data proportional to each pulse duration of the pit signal. As apparent from comparison of the pit signal b with the pit cutting signal d, when a pit length is relatively large, the pit cutting signal is set to a relatively low signal level. When a pit length is relatively small, the pit cutting signal is set to a relatively high signal level.

At a step at which a groove cutting signal is generated using a pit signal and groove signal, an analog signal e having a rectangular wave is generated as the groove cutting signal and output from the subtractor 51 to the light modulator 21. The groove cutting signal e is produced by subtracting the analog signal indicating a groove correction value from the groove signal converted into an analog signal.

In consideration of the power of the side lobe of a laser beam used for forming pits, the groove recording signal e is set to a relatively low signal level for a pulse duration corresponding to the on-state time of the pit cutting signal. Furthermore, as for a pulse of the groove cutting signal e of which pulse duration corresponds to each pit length, like the pit cutting signal, when a pit length is relatively large, the groove cutting signal is set to a relatively low signal level. When a pit length is relatively small, the groove cutting signal is set to a relatively high signal level.

As mentioned above, only when the resist base 23 is cut to form pits, the signal level of the groove cutting signal e is lowered by a magnitude proportional to the power of the side lobe of a laser beam used for forming pits, and a magnitude by which the signal level of the groove cutting signal is lowered is varied according to a pit length. Grooves having a uniform depth and breadth can therefore be formed in the resist base 23.

Figure 6:
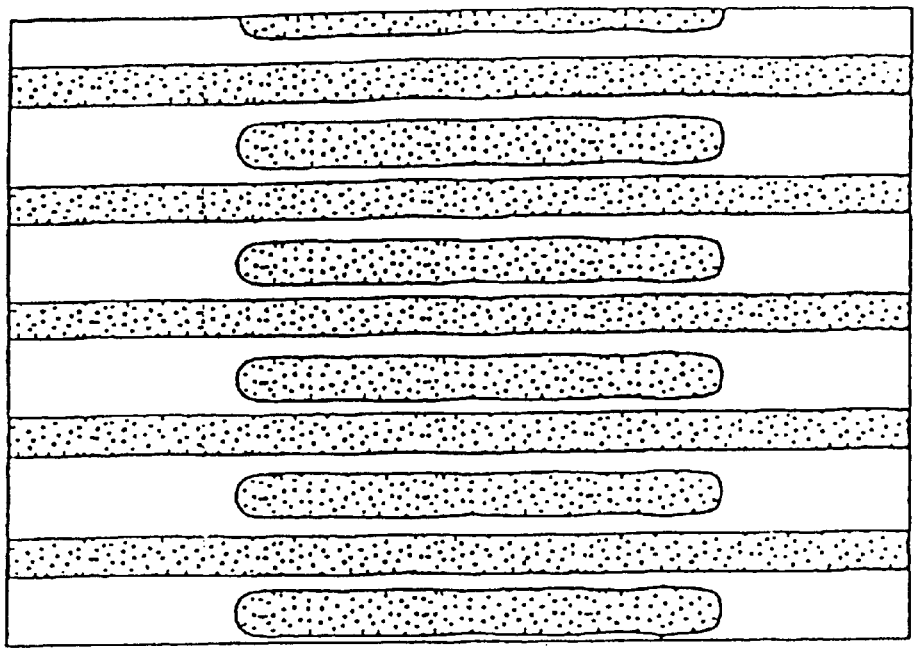
FIG. 6 is a diagram showing a pattern of pits and grooves formed in a stamper by the recording apparatus of the embodiment.
Figure 7:
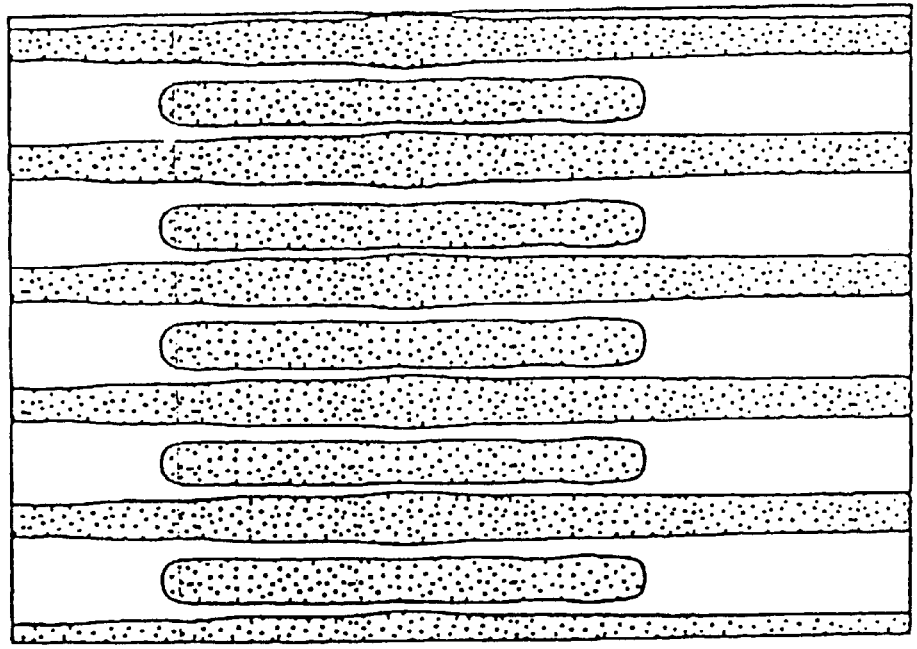
FIG. 7 is a diagram showing a pattern of pits and grooves formed in a stamper by a known apparatus.

FIG. 6 is a diagram showing a pattern of pits and grooves formed in a stamper by means of the recording apparatus in accordance with the embodiment of the present invention, and FIG. 7 is a diagram showing a pattern of pits and grooves formed in a stamper by means of a known recording apparatus.

As shown in FIG. 6, as far as grooves formed by the recording apparatus in accordance with the embodiment of the present invention are concerned, portions of grooves adjacent to pits have substantially the same breadth as the other portions thereof. There is no difference in depth between the portions of the grooves adjacent to pits and the other portions thereof. By contrast, as shown in FIG. 7, portions of grooves, which are formed by a known recording apparatus, adjacent to pits are apparently broader than the other portions thereof. As for the depth of the grooves, the portions of the grooves adjacent to the pits are deeper than the other portions thereof.

The recording apparatus in accordance with the embodiment of the present invention can form grooves, of which depth and breadth are more uniform than those of grooves formed by the known recording apparatus, in a stamper.

Figure 8:
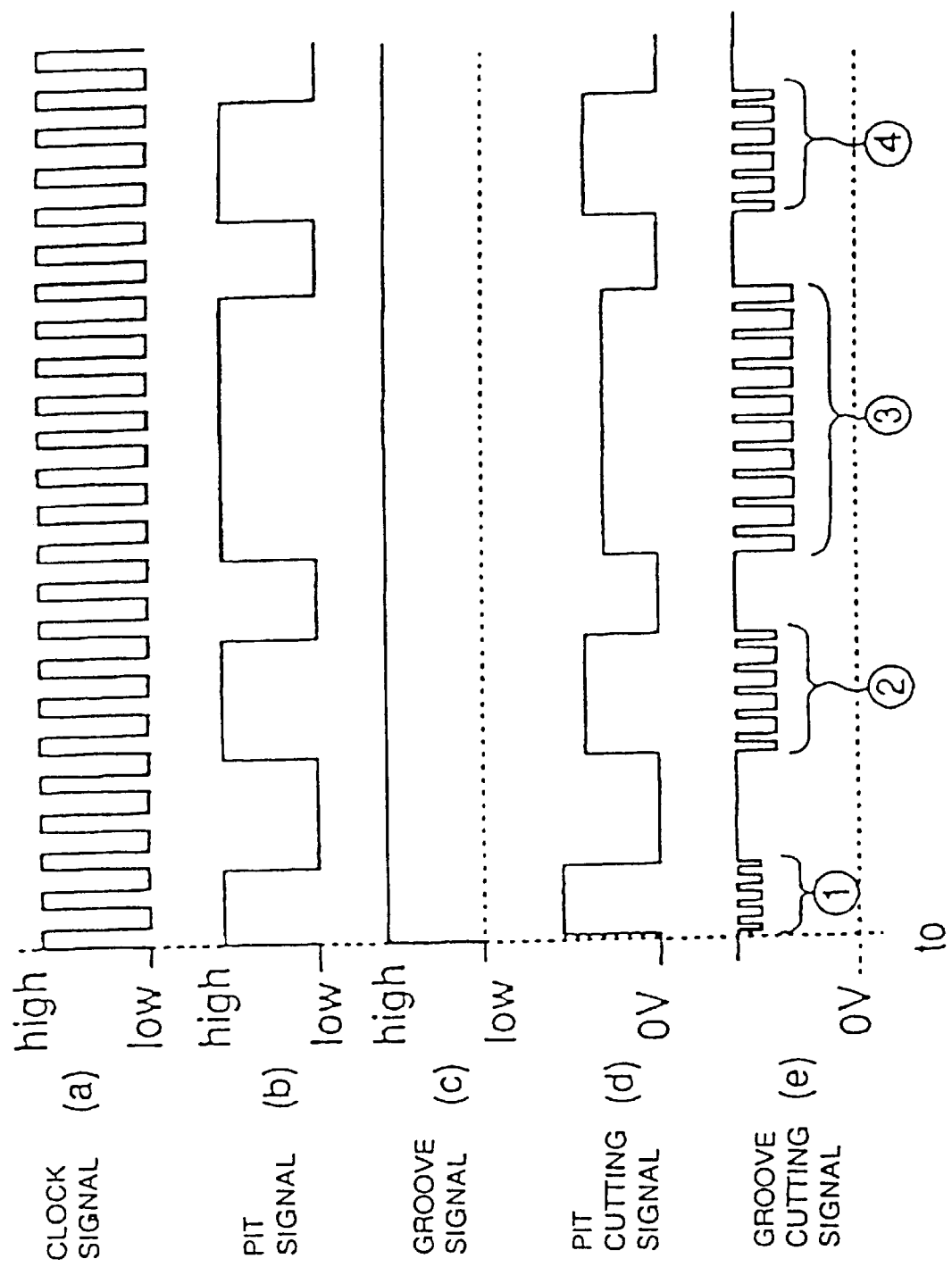
FIG. 8 is a timing chart indicating a variant of operations of signal processing performed by the signal generator shown in FIG. 4.

FIG. 8 is a timing chart indicating a variant of operations of signal processing performed by the signal generator shown in FIG. 4.

This variant is characterized in that when the resist base 23 is cut for forming pits, a plurality of rectangular waves, which exhibit the same voltage levels during an on-state time and off-state time and of which pulse duration during which an on state is indicated is shorter, are produced according to a pit length as pulses <1> to <4> of the groove cutting signal e of which pulse durations correspond to bit lengths. In other words, when the signal levels of each of the pulses <1> to <4> whose pulse durations correspond to the bit lengths are integrated relative to time, the signal levels of the pulses <1> to <4> are substantially identical to those of the pulses of the groove cutting signal e, which is shown in FIG. 5, of which pulse durations correspond to bit lengths.

Thus, this variant provides the same advantage as the aforesaid embodiment.

The description made above relates merely to an embodiment of the present invention and its variant. It does not, needless to say, mean that the present invention is limited to the description.

As described so far, according to the present invention, there is provided a recording apparatus capable of manufacturing an optical disk from which signals properly representing pits and grooves respectively can be reproduced even when the density of tracks is physically increased.

INDUSTRIAL APPLICABILITY

A recording apparatus in accordance with the present invention is suitable for use as a laser cutting machine.

What is claimed is:

1. A laser cutting apparatus for cutting pits and grooves in an optical disk wherein said grooves are formed in accordance with a length of said pits comprising:

a pit gain selection circuit for converting a signal corresponding to pit length data into gain data;

a pit cutting signal generation circuit for receiving said gain data and selecting gain data therefrom proportional to each pulse duration of a pit cutting signal and converting said selected gain data into a first analog signal;

a groove correction value circuit for converting a groove power correction value or a groove correction pulse frequency into a groove correction value according to said pit length data;

a groove correction signal generation circuit for receiving said groove correction value and calculating a magnitude of groove signal correction and converting said magnitude of groove signal correction into a second analog signal; and a subtractor receiving said second analog signal and subtracting said second analog signal from a groove signal to yield a control signal whereby a power level of a light beam used for forming said grooves and pits is adjusted by said second control signal.

2. The laser cutting apparatus of claim 1 further comprising a first timing circuit for adjusting said gain data from said pit gain data selection circuit prior to its receipt in said pit cutting signal generation circuit.

3. The laser cutting apparatus of claim 1 further comprising a second timing circuit for adjusting said groove correction value from said groove correction value circuit prior to its receipt in said groove correction signal generation circuit.

* * * * *

UNITED STATES PATENT AND TRADEMARK OFFICE
CERTIFICATE OF CORRECTION

PATENT NO.   : 6,341,121 B1
DATED        : January 22, 2002
INVENTOR(S)  : Hideaki Yamada It is certified that error appears in the above-identified patent and that said Letters Patent is hereby corrected as shown below:

<u>Title page, Item [54] and Column 1, line 1,</u>
In the Title, "RECORDER" should be -- LASER CUTTING APPARATUS --.

<u>Column 1,</u>
Line 29, "$\lambda NA$" should be -- $\lambda/NA$ --.

<u>Column 4,</u>
Line 56, "circuit 47" should be -- circuit 39 --

<u>Column 5,</u>
Line 2, "circuit 47" should be -- circuit 39 --.
Line 24, "circuit 47" should be -- circuit 39 --.
Line 40, "10-8" should be -- $10^{-8}$ --

Signed and Sealed this

First Day of October, 2002

*Attest:*

*Attesting Officer*

JAMES E. ROGAN
*Director of the United States Patent and Trademark Office*